United States Patent [19]

Kramer

[11] 4,097,905

[45] Jun. 27, 1978

[54] TAPE PLAYER TIME SIGNAL

[76] Inventor: Justin Kramer, 1028 W. 8th Pl., Los Angeles, Calif. 90017

[21] Appl. No.: 719,931

[22] Filed: Sep. 2, 1976

[51] Int. Cl.² .................... G11B 5/00; G11B 15/18; G11B 15/48

[52] U.S. Cl. .................... 360/12; 58/14; 360/72; 360/74

[58] Field of Search .................. 58/14; 360/12, 72, 74

[56] References Cited

U.S. PATENT DOCUMENTS

| | | | |
|---|---|---|---|
| 3,372,240 | 3/1968 | Boyers et al. | 360/12 |
| 3,376,700 | 4/1968 | Davis et al. | 58/14 |
| 3,469,038 | 9/1969 | Green | 360/12 |
| 3,644,682 | 2/1972 | Parilla | 360/12 |
| 3,795,866 | 3/1974 | Johnson | 360/12 |
| 3,877,363 | 4/1975 | Parilla | 360/12 |
| 3,919,834 | 11/1975 | Murakami et al. | 58/14 |

*Primary Examiner*—Vincent P. Canney

[57] ABSTRACT

A tape recorded system especially advantageous for reproducing a melody played on bells and a striking of the hour at the appropriate interval makes use of clock controlled electronic logic operable at the conclusion of the melody. A pulse generated by the bell sound on the tape trips the mechanism to sound the proper hour and by providing sufficient time for decay produces a realistic bell tone.

11 Claims, 3 Drawing Figures

TAPE PLAYER TIME SIGNAL

Bell instruments which employ tape loop recordings for the sound source ordinarily employ a pulse to start the cycle and foil on the tape which passes over a sensor which stops the tape at the end of the cycle. The pulse may be supplied from a program timer or from a momentary manual switch. Besides the momentary "on" switch, there is usually a momentary "off" switch which stops the tape. This method of stopping the tape has the disadvantage of producing the unwanted sound effect of a stopping tape. Yet some means of discontinuing a program must be provided in the manual operation mode. It should be observed also that this mode of stopping a program has the added disadvantage of having the bell music start in the middle of a selection the next time the tape is started.

A partial solution to this problem could be a system which would cut off the audio when the manual stop is pushed and permit the tape to recycle, i.e. to proceed until the foil sensor stops it. Here again, cutting off the audio abruptly leads to an effect that might be described as both unpleasant and unreal. It consequently seems desirable to avoid stopping the tape until the cycle is complete and avoid cutting off in an abrupt manner. A switch or gate which will cut off the audio with a decay period offers an acceptable solution provided bell sounds on a tape can be effectively arranged.

A tape loop which is termed a tolling bell is commercially available. This is a bell which rings about once every 8 to 10 seconds. Loops available are timed for 5 to 10 minutes of tolling at the end of which period they stop. The arrangement is quite inflexible. If for example an operator should only want five minutes of toll and have a ten minute tape, the only practical way of solving this would be to turn off the audio after a five minute interval, then wait another five minutes until the tape stops and then turn on the audio. This of course presents quite an inconvenient arrangement. Several solutions to this problem are suggested of which the following are examples:

No. 1. Use a very short tape loop and arrange the manual switches so that the on switch will start the tape and the off switch will stop the tape, not immediately, but when the foil stop reaches the sensor.

No. 2. Use a short tape loop and arrange the manual switches so that the on switch will start the tape and the off switch will operate an audio gate having a decay and also operate a switch that will stop the tape the next time the foil appears at the sensor.

Solution #1 might provide a few "extra" notes while Solution #2 offers an arrangement wherein the exact number of notes desired could be provided.

Present tape systems require one tape deck per function i.e. if one wishes to have an Angelus, Toll, Peal, and Swinging bell, four decks are required. While such an arrangement is acceptable to a degree, the same results could be achieved with a single deck using a four track system.

Present tape systems also provide an hour strike by the use of a tape which has recordings of hour strikes consecutively from one to twelve, with a foil stop at the end of each. This means that the tape must be advanced each hour or the wrong hour will strike.

Among the objects of the invention is to provide a new and improved hour strike tape loop system which has only 12 o'clock recorded and where the count is regulated by sensors on the clock mechanism, so that the clock will always strike the correct hour and, where there is no need to advance the mechanism each hour.

Another object of the invention is to provide a new and improved two track arrangement with improved decay after the last count of any hour.

Still another object is to provide a new and improved bell melody and hour strike tape loop system wherein pulses generated by the bell sounds on the tape are made use of in the electronic logic to reproduce the bell music as a melody followed by the correct hourly strike, and with a sufficient decay time to have the bell tones sound realistic. Still further among the objects of the invention is to provide a new and improved combination bell melody and hour strike tape loop system wherein the melody can be interchanged at will while at the same time retaining the same electronic mechanism for reproducing hour strike in an accurate and dependable fashion, and with the tone reproduction being entirely realistic.

With these and other objects in view, the invention consists in the construction, arrangement and combination of the various parts of the device, whereby the objects contemplated are attained as hereinafter set forth, pointed out in the appended claims and illustrated in the accompanying drawings.

Figures 1, 2:
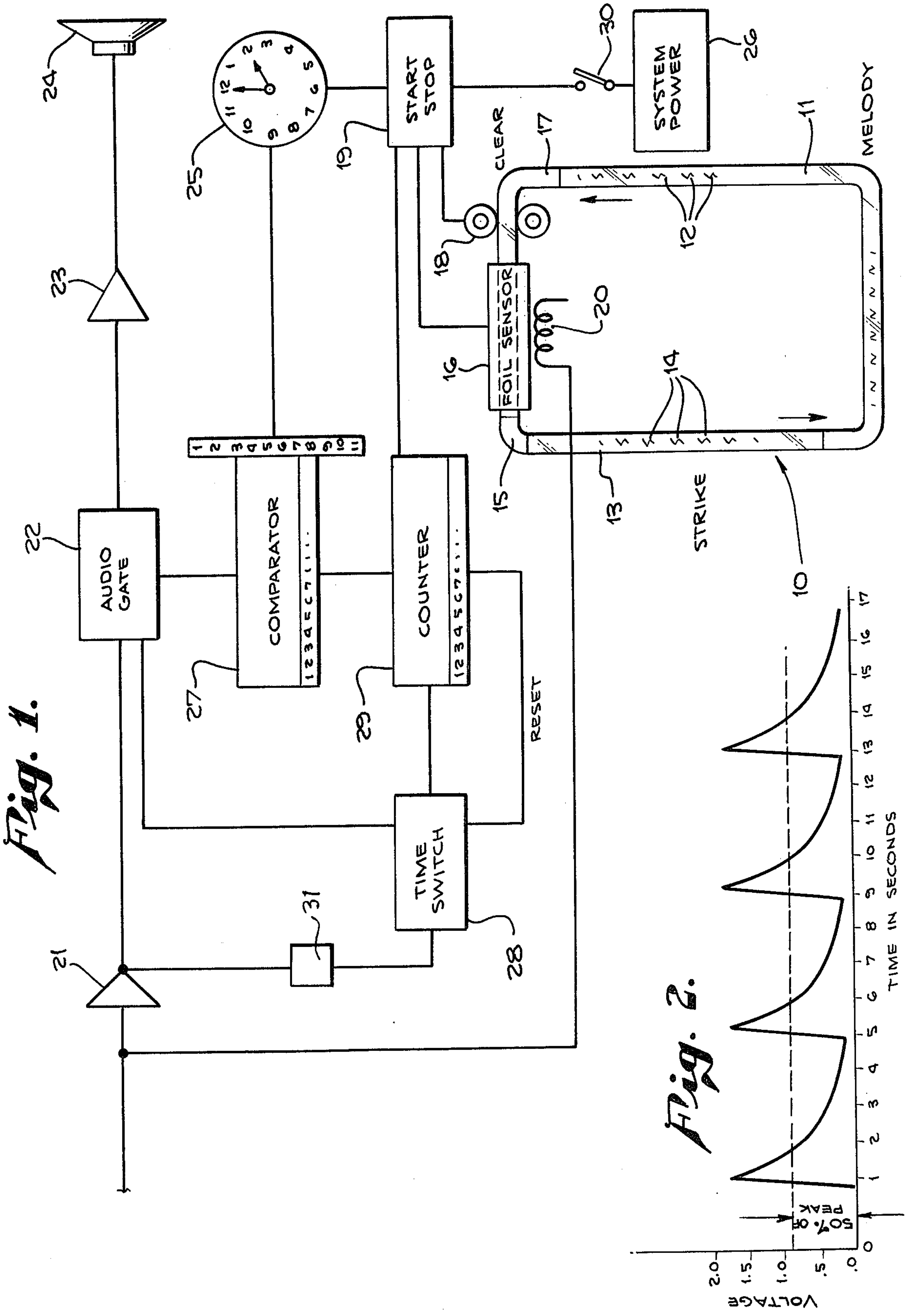
FIG. 1 is a schematic drawing of a tape loop and associated reproducing circuit.
FIG. 2 is a graph of bell tones where voltage is plotted against time in seconds.

In one embodiment of the invention chosen for the purpose of illustration wherein the electronic logic circuit of FIG. 1 is employed, there is a tape loop 10 on which is recorded a melody followed by 12 notes played on the hour strike bell. Referring to FIG. 2, all the notes can be regarded as pulse imprints. One length 11 of the tape contains the melody. For example, the familiar Westminster chime melody would have 16 pulses. Pulse imprint reproductions are indicated by the reference character 12. A second length 13 of the tape contains exactly 12 pulse imprints 14 corresponding to 12 hours on the clock. Still another length 15 of the tape has foil applied to its surface. Between the foil section and length 11 is a length 17 which is clear of recording, there being no pulse imprints of any kind of this length. In other words, this is a clear length. In the example described, tape travel is counter clockwise in the direction of the arrows of FIG. 1.

There is a conventional tape drive 18 connected to and subject to operation by a start-stop control 19 in the electronic circuit. During its travel the tape is adapted to pass a tape head 20 also of conventional construction.

A typical electronic circuit capable of performance with the specially designed tape loop 10 includes a preamplifier 21 associated with the tape drive which has one connection through an audio gate 22 to an amplifier 23 which powers a loud speaker 24. A high-pass filter 31 may be employed if desired.

The electronic circuit is controlled by a clock 25 having the usual hour and minute hands and equipped in conventional fashion to trigger the electronic circuit at each hourly interval, the circuit being supplied with power from a source 26. The clock also sends a signal to a comparator 27.

The preamplifier 21 also connects to a time switch 28, the time switch in turn having three connections, one to the audio gate 22, one directly to a counter 29, and a third connection to a second terminal of the counter 29.

In the playback of bell music, the strike of the bell is characterized by a rapid rise in voltage followed by a gradual decay. The higher the frequency, the more rapid the decay. FIG. 2 plots voltage against time. If a threshold is established at the dotted line, for example, the voltages obtained in the playback of bell music will appear as a series of pulses. These pulses are pulse imprints which are referred to herein and are the basis for the system.

To start operation a switch 30 is closed. When operating, the circuit just described together with the tape loop 10 is started as previously noted by an impulse from the clock 25 and stopped by the foil sensor when the foil makes contact with a foil sensor 16 and sends the appropriate signal back to the start-stop control 19. This arrangement is readily adapted for conversion of tape systems which already employ a tape loop for an hour strike system.

Upon being triggered by the clock 25 at any hour, the tape drive is activated and the tape commences to pass the tape head 20 and a signal is sent to the preamplifier 21. The signal is amplified and simultaneously fed in one direction to the audio gate 22 and in another direction to the time switch 28. The time switch 28 monitors the tape signal. If there is no signal from the tape for a period of 5 seconds, and this is the condition which occurs when the clear length 17 passes the tape head, the time switch 28 will provide a signal which will open the audio gate 22 permitting the signal from the preamplifier 21 to pass the audio gate to the amplifier 23 and loud speaker 24. It will simutaneously send a signal to the counter resetting it to 0. The purpose of the clear length is to provide about a five second delay, with the particular tape loop under consideration, to ensure that the tape travel is at the beginning of a cycle. The tape length 17 can be considered as a period of silence on the tape. As the tape continues to travel, the 16 sounds of the melody will be passed through the audio gate to the loud speaker and then the clock strikes will commence. If for example, the clock is at 2:00 o'clock the minute hand being at 12 will energize the circuit and the hour hand being at 2 will cause a 2:00 o'clock or 2 count signal to be passed to the comparator 27.

Simultaneous with the signal which opens the audio gate 22, the time switch 28 opens the path for signals from the preamplifier 21 to the counter 29. In the chosen example where there is a 16 pulse vorschlag melody the counter will count the notes of the melody and then proceed to count the hour strike, and counts 1 through 11 inclusive are passed to the comparator. Here they are compared with information received from the clock which has signalled 2:00 o'clock. Therefore after the two pulse imprints 14 from the length 13 of tape, have been reproduced at the loud speaker, the comparator will act to close the audio gate. This is accomplished by the comparator making a comparison between 2:00 o'clock clock signal and counts received from the counter where when the two count coincides with the two count signal from the clock the comparator will act. The pulse will close the audio gate 22 with a decay of selected length, for example, $3\frac{1}{2}$ seconds, to be completely shut down before the next bell sounds on the tape. There is no reason to have a signal from the clock at the 12:00 o'clock position since there is no reason to stop the sound from the tape before the full count of 12 from the length 13 of the tape has passed. Thereafter, the tape continues to travel until the foil makes contact with the foil sensor at which time the tape drive 18 will be signalled to stop until it receives another command from the clock, for example at 3:00 o'clock, unless of course, the clock is programmed to skip 3:00 o'clock. At the next hour to be struck, for example 3 o'clock, the operation will commence in the same manner as has been described except that after the vorschlag melody there will be three impulses 14 of the tape sounded on the loud speaker before the comparator acting on signals respectively from the counter 29 and clock 25 closes the audio gate to prevent the balance of the clock strike impulses 14 from sounding.

Should by any chance the tape drive be stopped at some point along either the tape length 11 or the tape length 13, when the tape is started again, the time switch 28 will receive a signal at some time interval less than the selected five second period, which is the time established by the length 17 of the tape which is clear of recorded material. In that event the time switch will send a reset signal to the counter and start the counter over again. This will occur as many times as there are intervals of less than five seconds passing the tape head 20 and will continue until the length 17 reaches the tape head 20. When that happens there will be the needed 5 seconds of silence to start the counter in cooperation with the clock signal so that the correct hour will then be sounded by the loud speaker.

Although the system has been described as one incorporating the tape length 11 comprising a melody, the melody can be dispensed with while still retaining the principals of operation of the system. In that event the counter will be so programmed as to count only the hour strikes of 1 to 12 inclusive and omit the 16 beat melody count. In other respects such a system operates on the same principle as has been previously described.

In the circuit described the foil 15 passing or contacting the sensor 16 is depended on for stopping the tape. In the alternative the foil sensor can be replaced with a delay relay which will be tripped when the 12 count appears on the counter. In that event the relay will shut down the system after the twelve count, with a delay of for example, seven and one-half seconds which would allow a proper decay of the sound in the event of the twelve o'clock strike. Still another way of stopping the tape can be obtained by programing the time switch 28 to provide a stop command if after it has sensed the required length of unrecorded tape and placed the system in the "play" mode, it senses a second length of unrecorded tape of predetermined play time, e.g. 5 seconds (command path not shown on drawings). Other phases of the system operate in the same manner as has already been detailed.

Figure 3:
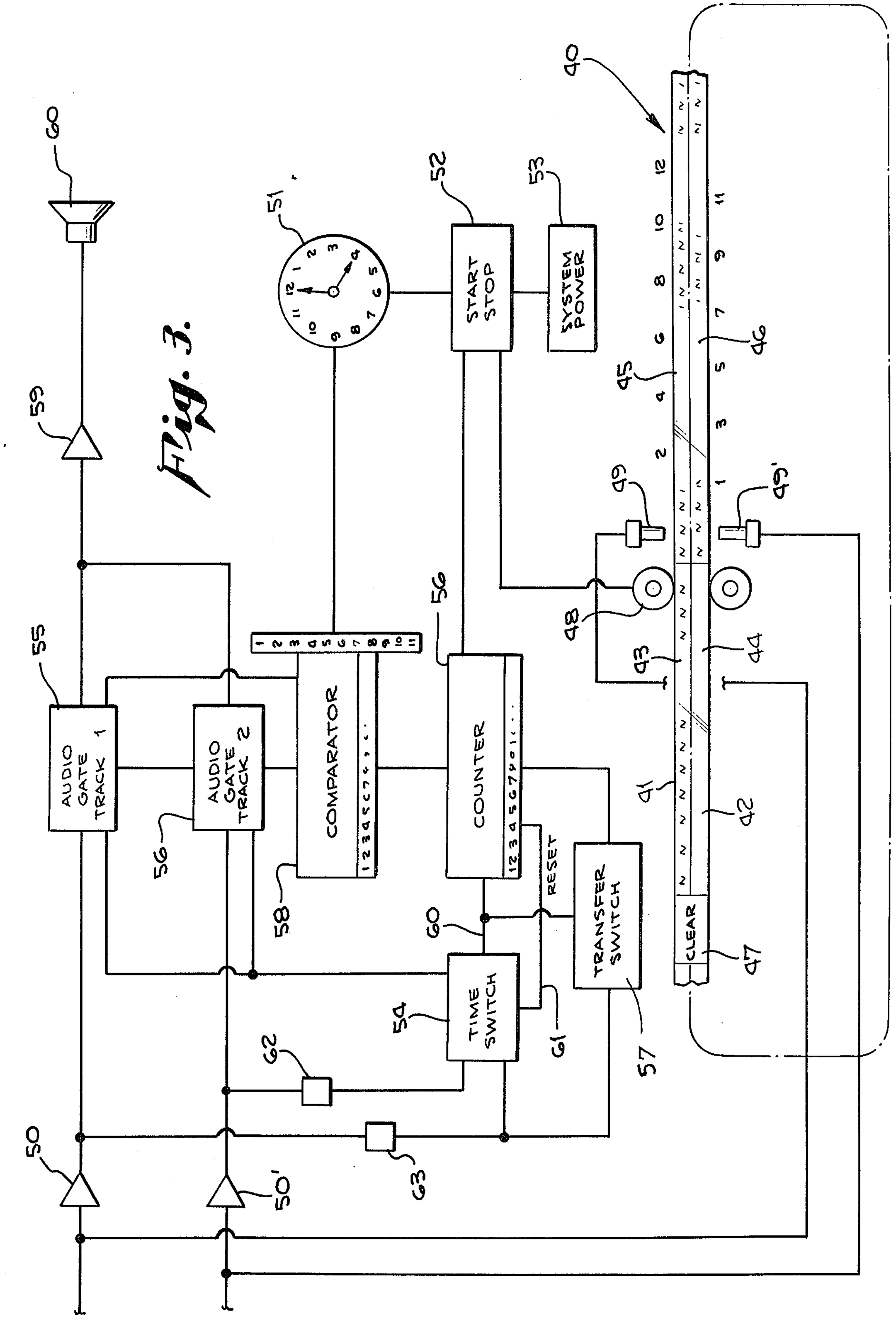
FIG. 3 is a schematic drawing of a second form of tape loop and associated reproducing circuit.

In a second form of the invention illustrated by the circuit of FIG. 3 a tape loop 40 is employed which has two tape tracks 41 and 42. On tape track 41 there is an arbitrary length 43 for the recording of a melody. Such a melody can have any number of beats or impulses since the pulses of the melody in this form of the invention will not need to be counted. On track 42 a corresponding length 44 is clear of any recorded material. On track 41 following the length 43 for the melody is a length 45 on which is recorded only the even hour strikes, namely for the hours of 2, 4, 6, 8, 10 and 12. On track 42 is a similar length 46 which carries the recording of only the odd hour strikes, namely for the hours of 1, 3, 5, 7, 9, and 11. On both tracks there is a corresponding length 47 on which there is no recorded material, this length being a period of silence of, for example, 5 seconds. For driving the tape loop 40 there is a customary tape drive 48 and two tape heads namely, a tape head 49 for the tape track 41 and a tape head 49' for the tape track 42.

In this form of the device, there is provided in the electronic circuit a preamplifier 50 for the tape head 49 and a preamplifier 50' for the tape head 49'.

The system is controlled by a conventional hourly clock 51 having the customary minute and hour hands. The clock is so equipped that the minute hand when occupying the 12:00 o'clock position triggers a start-stop control 52 so as to draw power from a power supply 53 and energize the tape drive 48, and at the same time to supply power to the various circuits.

Also in the circuit is a time switch 54 connected to both of the preamplifiers 50 and 50'. The time switch 54 is also connected to two audio gates, namely, an audio gate 55 for the preamplifier 50 and an audio gate 56 for the preamplifier 50'. The audio gates may be so designed as to close at different ratio for different frequencies with the high frequencies being shut off first. The time switch 54 is likewise connected to a counter 56 and a transfer switch 57 by a direct connection 60 and a reset connection 61. Both the counter 56 and the clock 51 are connected to a comparator 58. High pass filters 62 and 63 are shown in the lines from the respective preamplifiers 50 and 50'.

In the operation of the embodiment of the invention of FIG. 3 there are some advantages which can be enjoyed over circuit of the first described FIG. 1 in that the melody or a vorschlag can be any number of notes since these notes as pulse beats are not counted. This means that a tape having a different melody, for example a seasonal one, can be inserted in the system without need for alteration of the system. Also there can be a longer decay following the last count of each hour.

When the system of FIG. 3 is turned on by an impulse from the minute hand of the clock, both tape tracks namely 41 and 42 are passed simultaneously over corresponding tape heads 49 and 49', with a signal going to both of the preamplifiers 50 and 50'.

The outputs from the two amplifiers 50 and 50' are fed simultaneously to respective audio gates 55 and 56, and then on jointly to a power amplifier 59 and loud speaker 60. At the same time, the signal from track 41 through preamplifier 50 is sent to both the time switch 54 and transfer switch 57. The signal from track 42 however, is sent through the preamplifier 50' only to the time switch 54. The purpose of the time switch, it will be understood, is to ensure that the cycle is always started at the beginning. Inasmuch as time switch 54 serves both tracks, impulses from both tracks effect the counter 56. For example, as the tape loop commences passing the tape heads 49 and 49', when the length 47 is encountered by the tape heads there will be the needed silent period of 5 seconds. In the event this period of silence is sensed both audio gates 55 and 56 will open. The signal from track 41 will pass to the transfer switch whereas the signal from track 42 avoids the transfer switch 57 and travels through the time switch 54 to the counter 56.

After the first count from track 42 which counts the odd numbered hourly counts beginning with one, the transfer switch will close and both tracks 41 and 42 will pass pulses to the counter 56, and the counter will count from one to twelve, passing the counts to the comparator.

Meanwhile the clock 51 is passing a signal to the comparator which notes the hour. If for example the hour hand is at 5:00 o'clock after two counts from track 41 and three counts from track 42 have been counted, equalling five in all and coincide with the five count signal from the clock, signals will be sent to both audio gates 55 and 56 to close down after an appropriate decay thereby to prevent any additional hour strikes from being sounded from the loud speaker.

In this form of the device, had it been only 1:00 o'clock a signal from the clock 51 would have been sent to the comparator indicating a one count and a single count coming from track 42 to the counter and comparator would cause a signal to be sent to the audio gates 55 and 56 to shut down with appropriate decay so that only the "one" count would be heard.

The description with respect to the comparator and counter and the shutting down of the audio gates progresses in the manner described, for all hours except for eleven and twelve in this form of the device. At the eleventh hour since that is the last hour of impulse on track 42 only track 41 needs to be shut down and this is done at the count of eleven. At the twelfth hour neither track needs to be shut down since this is the full count of both tracks. The twelfth count on the counter passes on a signal to the start-stop control 52, after a delay, which permits the last count on the tape to decay. This delay is calculated so that the tape will be stopped several seconds, more than five seconds for example, before the start of the melody.

In a manner similar to that described for the first form of the invention, when the tape travel commences if there is a pulse received from the tape, either track, in a period of less than five seconds, the time switch will not signal an opening of the audio gates 55 and 56. Instead the counter will be reset in the same manner as has been described in connection with the first form of the invention, and this resetting will continue until there is the required period of silence, which for most instances is about five seconds.

Having described the invention what is claimed as new in support of Letters Patent is:

1. A musical tape play system for the reproduction of bell tones comprising a sound tape length having electronically reproduced thereon individual recordings of bell tones and a starter length of tape preceeding said recordings clear of recordings, an electric circuit including respectively a tape head, audio gate means, an amplifier and loud speaker combination, a clock mechanism, electric powered tape travel means, timing means and accompanying pre-amplifier means all electrically connected in said circuit, said timing means and accompanying pre-amplifier means being responsive to said starter length of tape and adapted to open said audio gate means to the speaker, said timing means including reset means responsive to pulse recordings on the tape to reset the timing means, counter and comparator means electrically connected in the circuit responsive jointly to said clock mechanism and said timing means whereby reproduction of one or more of said individual pulse recordings will be effected thereby and the remainder of said individual pulse recordings will be silenced, and stop means in said circuit spaced from the individual pulse recordings and electrically connected to the tape travel means acting after reproduction of the last of said individual pulse recordings to stop action of said tape travel means after a decay interval has passed.

2. A musical tape play system as in claim 1 wherein said stop means comprises a foil length in the tape following said individual pulse recordings.

3. A musical tape play system as in claim 1 wherein said stop means comprises a delay relay.

4. A musical tape play system as in claim 1 wherein there is at least one length of tape carrying a series of pulse recordings comprising a melody.

5. A musical tape play system as in claim 4 wherein said series of pulse recordings is at one end of said individual pulse recordings.

6. A musical tape play system for the reproduction of bell tone melodies and clock strike bell tones comprising:

a sound tape length having electronically reproduced thereon a bell melody comprising respectively
a series of bell pulse imprints,
12 individual pulse imprints,
a sensor imprint at one end of said series of bell pulse imprints and,
a starter length of tape at the other end of said series of bell pulse imprints clear of imprints,
and an electronic circuit including respectively a tape head,
audio gate means,
an amplifier,
a loud speaker,
an hour clock having electric contacts, and electric powered tape travel means all electrically interconnected in said circuit,
timing means in said circuit responsive to said starter length of tape adapted to open said audio gate means to the speaker,
said timing means including reset means operative in the absence of a clear length of tape to reset said timing means,
a counter and comparator means electrically interconnected in said circuit responsive jointly to said clock and said timing means whereby only the correct hourly number of individual pulse imprints will reproduce in sequence with the series of bell pulse imprints
and the remainder of said individual pulse imprints will be silenced,
and stop means in the circuit responsive to tape condition after reproduction of the last of said individual pulse imprints to stop action of said tape travel means after a decay interval has passed.

7. A musical tape play system for the reproduction of clock strike bell tones comprising:

a sound tape length having electronically reproduced thereon individual pulse imprints of bell tones,
a sensor imprint at one end and a starter length of tape at the other end clear of imprints,
an electrical circuit including a tape head,
audio gate means,
an amplifier,
a loud speaker,
an hour clock and electric powered tape travel means all electrically interconnected,
timing means and accompanying pre-amplifier means electrically interconnected in said circuit and responsive to said starter length of tape, said timing means being adapted to open said audio gate means to the speaker,
said timing means including reset means responsive to pulse imprints on the tape to reset the timing means,
counter and comparator means electrically interconnected in said circuit and responsive jointly to said clock and said timing means whereby only the correct hourly number of individual pulse imprints will reproduce and the remainder of said individual pulse imprints will be silenced,
and stop means in said circuit acting after reproduction of the last of said individual pulse imprints to stop action of said tape travel means after a decay interval has passed.

8. A musical tape play system as in claim 7 wherein there are parallel tape tracks and corresponding separate tape heads, one of said tracks having individual pulse imprints thereon corresponding to even numbered hours, the other of said tracks having individual pulse imprints corresponding to odd numbered hours in staggered relationship with said first identified pulse imprints, an audio gate means for each of said tracks.

9. A musical tape play system as in claim 8 wherein there is a tape length on one of said tracks having a series of pulse imprints comprising a melody at one end of the individual pulse imprints.

10. A musical tape play system as in claim 9 wherein the series of pulse imprints is on the track carrying the pulse imprints for the even numbered hours.

11. A musical tape play system as in claim 9 wherein the series of pulse imprints is of arbitrary length on the track carrying the pulse imprints for the even numbered hours, and the length of the other track corresponding to the series of pulse imprints is clear of recorded material.

* * * * *